United States Patent [19]

Engelhardt et al.

[11] 4,252,532

[45] Feb. 24, 1981

[54] PROCESS FOR DYEING EVENLY SYNTHETIC FIBROUS MATERIALS

[75] Inventors: Friedrich Engelhardt; Karl Hintermeier, both of Frankfurt am Main; Joachim Ribka, Offenbach am Main; Ralf Zimmermann, Hofheim am Taunus, all of Fed. Rep. of Germany

[73] Assignee: Hoechst Aktiengesellschaft, Fed. Rep. of Germany

[21] Appl. No.: 852,949

[22] Filed: Nov. 18, 1977

[30] Foreign Application Priority Data

Nov. 24, 1976 [DE] Fed. Rep. of Germany ....... 2653284

[51] Int. Cl.$^3$ .............................................. D06P 1/52
[52] U.S. Cl. ....................................................... 8/557
[58] Field of Search ................... 8/173, 92, 89 R, 174, 8/21 C, 552, 557

[56] References Cited

U.S. PATENT DOCUMENTS

| | | | |
|---|---|---|---|
| 3,377,130 | 4/1968 | Millson et al. ......................... | 8/89 R |
| 3,802,905 | 4/1974 | Beyer et al. ............................ | 8/173 |
| 3,830,627 | 8/1974 | Daeuble et al. ........................ | 8/92 |
| 3,892,522 | 7/1975 | Schade et al. .......................... | 8/93 |
| 3,957,425 | 5/1976 | Tullio ..................................... | 8/89 R |
| 3,963,432 | 6/1976 | Hauxwell ................................ | 8/173 |
| 3,989,456 | 11/1976 | Vescia et al. ........................... | 8/169 |
| 4,063,880 | 12/1977 | Tullio ..................................... | 8/89 R |
| 4,072,465 | 2/1978 | Daeuble .................................. | 8/92 |
| 4,101,274 | 7/1978 | Beutler et al. .......................... | 8/173 |
| 4,137,251 | 1/1979 | Berger .................................... | 8/173 |
| 4,148,779 | 4/1979 | Blackwell ............................... | 8/92 |

FOREIGN PATENT DOCUMENTS

| | | | |
|---|---|---|---|
| 2508472 | 9/1976 | Fed. Rep. of Germany ............. | 8/173 |
| 1161181 | 8/1969 | United Kingdom ....................... | 8/176 |

*Primary Examiner*—Joseph L. Schofer
*Assistant Examiner*—Maria S. Tungol
*Attorney, Agent, or Firm*—Connolly and Hutz

[57] ABSTRACT

Process for dyeing evenly synthetic fiber materials and mixtures thereof with natural fibers, with water-insoluble disperse dyestuffs according to the exhaust method, which comprises adding water-soluble or dispersible linear polyesters that have been obtained by polycondensation of dicarboxylic acids with diols, including sulfo-groups-containing chain links, with an average molecular weight of 800 to 5,000, combined with surface-active oxethylation products, at a blend ratio of 1:0.25 to 1:1.5, as dispersing system with levelling action to the aqueous dyeliquors, besides said dyestuffs and pH-controlling substances.

12 Claims, No Drawings

PROCESS FOR DYEING EVENLY SYNTHETIC FIBROUS MATERIALS

When textile material of synthetic fibers is dyed at high temperatures (HT) by means of disperse dyestuffs according to a rapid dyeing method, there are often encountered difficulties respecting levelness, fastness to rubbing and stability of the bath, especially in case of triple combinations of dyestuffs.

A process is known from German Offenlegungsschrift No. 25,08,472 which allows to dye synthetic fiber material or mixtures thereof with natural fibers, with water-insoluble disperse dyestuffs according to the exhaust process, with very good levelness and stability of the liquors, in such a way that besides said dyestuffs sulfo-group-containing water-soluble or dispersible linear polyesters are added to the aqueous dyeing liquors as levelling agents. This method helps already avoid a number of difficulties due to the dyestuff.

It has been found now, that synthetic fiber materials and mixtures thereof with natural fibers may be dyed with an even better levelness and without filtering-off of the dyestuff according to a common high-temperature process or a rapid-dyeing process as per the exhaust method, with water-insoluble disperse dyestuffs, especially in case of triple dyestuff combinations which are difficult to dye and in case of dyestuffs prone to stability troubles of the bath, if in addition to said water-soluble or dispersible polyesters having an average molecular weight of 800 to 5,000, preferably 1,500 to 3,000, surface-active oxethylene products are added at a mixing ratio of 1 part of polyester to 0.25 to 1.5 parts of the oxethylene products, and if this combination is applied in the aqueous liquors, together with said dyestuffs and pH-controlling substances, as dispersing system with levelling action corresponding to a total concentration of 0.5 g/l to 3 g/l.

In the context of the process according to the present invention there could be noticed surprisingly, that upon using the afore described combination of polyesters and oxethylation products, and while taking into consideration the indicated mixing ratios and the concentration ranges, upon high temperature dyeing of (texturized) polyester fibers as packages with disperse dyestuffs according to the exhaust method, a remarkably better result is obtained concerning levelness, reproducibility also for triple combinations with dyestuffs having affinity characteristics which differ from each other, and also concerning the bath stability (conservation of the optimum particle size of the dispersions), than the result which could have been achieved when using separately the individual components of the described dispersion system in comparable application concentration, a fact which may be interpreted as a synergistic effect.

Another result which was also surprising is the fact that the combined application of the soluble polyesters with the non-ionic surface-active component under the specified conditions has neither caused in one single case a shifting of the color shade for dyestuff combinations, nor a diminution of the yield (dyestuff being retained in the liquor because of a beginning dissolution of the dispersion due to the surface-active portion).

Object of the process according to the present invention is to prevent the difficulties occurring upon high temperature dyeing of polyester fibers in view to levelness, bath stability and fastness to rubbing, as well as to the reproducibility of combination colorations. To a large extent these difficulties stem from the very properties of the dyestuffs. The use of the novel combination of polyester and oxethylation product leads to a certain retardation of the dyestuff absorption, the additive influencing the dyestuff particles of the dispersion. However, there was never observed the necessity of extending the dyeing period, a statement which also comprises rapid-dyeing processes.

Some disperse dyestuffs, in the presence of turbulences in the apparatus during the dyeing process, show a certain tendency to give unstable dispersions; there may occur precipitations which deposit on the packages and diminish the fastness to rubbing. The application of the dispersing agent combination according to the invention prevents such difficulties, improves the operational safety and allows to use for the high temperature dyeing process of packages such dyestuffs that were unsuitable in the past because of their lack of liquor stability.

According to the present invention there are used as dispersing agent component such polyesters, that have been obtained by means of polycondensing (a) one or several saturated or unsaturated aliphatic, cycloaliphatic or aromatic dicarboxylic acid(s) with
(b) one or several saturated or unsaturated aliphatic, cycloaliphatic or aromatic diol(s), 5–30 molecular % of the totality of dicarboxylic acid chain links or diol chain links carrying sulfo groups or the salts thereof.

Up to 40% of the chain links in these polyesters may be substituted by hydroxycarboxylic acid units. According to the process there may be taken into consideration as dispersing agent component especially such polyesters, that are prepared with the use of a benzene dicarboxylic acid as dicarboxylic acid component, optionally carrying a sulfo group, and as the prevalent diol component of which there have been used aliphatic bisalcohols with ether bridges, preferably diethylene glycol or polyethylene glycols.

Preferably used as dispersing agent component for the purpose of the invention are polyesters having general formula

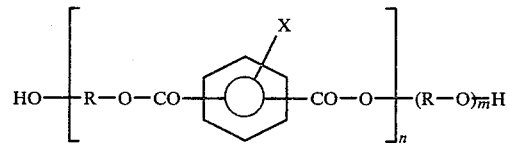

wherein m is zero or 1 and n is such a number that the average molecular weight of the polyester is from 800 to 5,000, wherein each X, which may be the same or different, represents a hydrogen atom or a group having formula

wherein M represents a hydrogen atom or an alkali metal atom, especially sodium, or an ammonium group or a substituted ammonium group, especially triethyl ammonium, at least one X in said polyester is a sulfo-group-containing radical, and wherein R, which may be the same or different, is a bisalcohol radical with 2 to 10 carbon atoms of a saturated or unsaturated aliphatic, cycloaliphatic or aromatic compound.

Among the compounds covered by the afore mentioned formula, those polyesters may be emphasized in respect to the process claimed herewith, wherein of the phenylene radicals in the general formula 10-20 mol % have been obtained by condensation of 5-sodium sulfonatopropoxy-isophthalic acid dimethyl ester or 5-sodium sulfonato-isophthalic acid dimethyl ester, 40-90 mol % by condensation of isophthalic acid or the derivatives thereof, and 0-40 mol % by condensation of terephthalic acid, preferably as the dimethyl ester thereof, and wherein 0-95 mol % of the bisalcohol are diethylene glycol and 5-40 mol % of the bisalcohol are one or several diols different from the a.m., preferably polyethylene glycols having an average molecular weight of 300-1,000.

A further variation of the composition of water-soluble polyesters known to be suitable, consists in substituting 0-40 mol % of the total part of benzene dicarboxylic acids in the general formula by an aliphatic or cycloaliphatic dicarboxylic acid having 4 to 10 carbon atoms.

The surface-active oxethylation products used as dispersing agent component according to the present invention are especially a mixture of (A) fatty acid polyglycol ester, (B) polyglycol and (C) oxethylated alkyl-aryl compounds; preference is given to the use of oxethylation products which represent a mixture of (A) addition products of 1 to 10 mols of ethylene oxide to 1 mol of a saturated or unsaturated aliphatic carboxylic acid having 10 to 20 carbon atoms, (B) polyethylene glycols having an average molecular weight of 300 to 1,000, especially of 500 to 800, and (C) addition compounds of 5 to 15 mols of ethylene oxide to 1 mol of an alkyl phenol having 12 to 22 carbon atoms.

In general, these mixtures contain the component A in excess or in a part identical to that of component C. The portion of each of the components A and C in the mixture most often keeps within the limits of about 30 to 40 weight %.

According to the process claimed herewith the dispersion system consisting of the polyesters and the surface-active oxethylation products may be added to the dyeing liquors either as a finished mixture or the individual components thereof are added separately.

Suitable fiber materials for the process of the invention are all synthetic fibers which can be dyed according to the high temperature exhaust process with water-insoluble disperse dyestuffs (Colour Index: Disperse Dyes). These are for example cellulose triacetate fibers, polyamide fibers and polyurethane fibers, but preferably linear polyester fibers, especially as texturized fibers and as packages, such as muffs, (loosely wound bobbins), for at this stage of the work-up the fiber is particularly sensitive to dyestuff tendencies to unlevelness. The synthetic fiber portion of fibrous mixtures may also be dyed according to the claimed process.

The following Examples illustrate the invention:

EXAMPLE 1

Muffs of texturized polyester filaments are penetrated in a high temperature dyeing apparatus and at a goods-to-liquor ratio of 1:10, by a dyeing liquor of 130° C. consisting of soft water having a pH of 4.5 (adjusted with acetic acid) and 0.5 g/l of a linear, water-soluble polyester having a molecular weight of 2,500, that has been prepared by

| polycondensing | |
|---|---|
| isophthalic acid | 50 mol % |
| dimethylterephthalate | 40 mol % |
| 5-sulfopropoxy-isophthalic acid dimethyl ester | 10 mol % |
| diethylene glycol | 100 mol % |
| and | |
| polyethylene glycol having an average molecular weight of 600 | 10 mol % | and to which liquor has then been added 0.25 g/l of a non-ionic combination of 40 weight % of the addition compound of 6 mols of ethylene oxide to 1 mol of oleic acid, 20 weight % of polyethylene glycol with an average molecular weight of 600, and 40 weight % of the addition compound of 13 mols of ethylene oxide to 1 mol of tributyl phenol.

To this liquor is added rapidly, by means of a feeding device, a mixture that is predispersed at 40° C. with water and that contains the following commercially available disperse dyestuffs:

0.46% of the disperse dyestuff of formula I

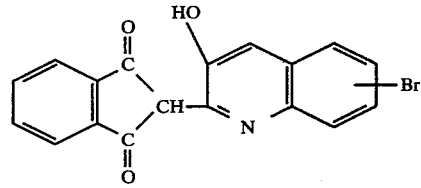

0.52% of the disperse dyestuff of formula II

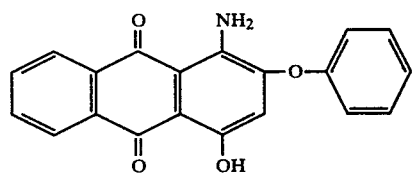

and 0.17% of the disperse dyestuff of formula III (at approximately equal parts)

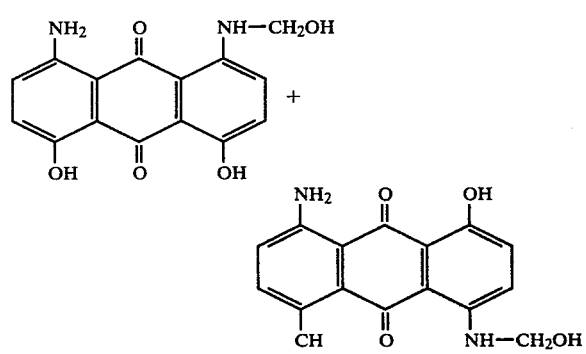

A quantity of 20 l/kg per minute of this dispersion flows through the muff. The liquor is cooled after a 30 minutes' treatment at 130° C., the liquor is then allowed to flow off and the dyed material is cleaned by reduction.

The result is a perfectly even brown color shade with a full dyestuff yield.

For comparison's sake, the same dyeing process is carried out with identical dyestuffs and under identical conditions to the above described ones, however without the addition of the water-soluble linear polyester, but with the use of commercially available dispersion agents (based on naphthalene sulfonic acid/formaldehyde-condensation products) and levelling agents (based on fatty acid polyglycol ester, polyglycol and oxethylated alkyl phenols), resulting in an uneven coloration with strong differences of the color depths and the color shade of the individual packages.

EXAMPLE 2

The dyeing process is carried out according to Example 1 with the use of a combination of additives comprising the same linear water-soluble polyester and the same oxethylate mixture, however at the ratio of 1:1 (not at the ratio of 1:0.5 stated for Example 1), i.e. 0.5 g/l each of the two components mentioned there.

The packages are dyed at 130° C. for 30 minutes, resulting after the usual finish processing in a perfectly even brown coloration.

The separate use of each of the two additive components in the context of the aforedescribed dyeing operation does not produce the same good results concerning levelness and reproducibility of the color shades as those obtained with the aforedescribed combination, even though the applied concentrations may vary.

EXAMPLE 3

The dyeing process is carried out according to the description given for Example 1, but with the use of 0.4% of the disperse dyestuff of formula IV

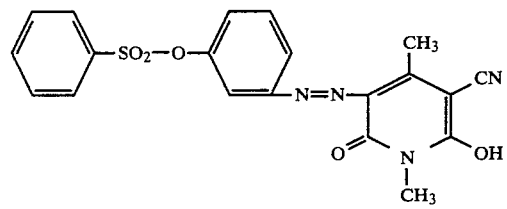

0.32% of the disperse dyestuff of formula V

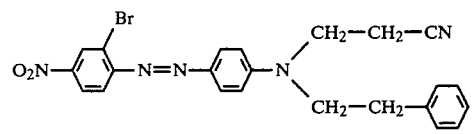

0.26% of the dyestuff of formula VI

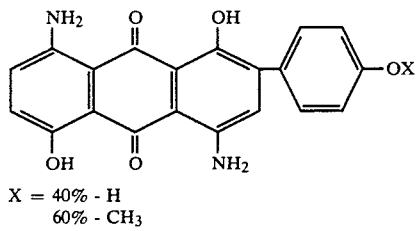

X = 40% - H
60% - CH$_3$

The meterial is dyed at 130° C. for 25 minutes, and the thus obtained dyeing is given an after-treatment by reduction; there is also obtained an even brown coloration.

If the additive combination of the invention for the dyeing according to Example 1 is replaced by commercially available dispersing and levelling agents, the result is an uneven coloration with strong differences of color depth and color shade.

EXAMPLE 4

(a) Comparison

At a liquor ratio of 1:12, a dyeing liquor at 80° C. is allowed to penetrate packages (muffs) of texturized polyester filaments in a high temperature dyeing apparatus, the flow-through dyeing liquor consisting of soft water which is adjusted with acetic acid to a pH of 5 and containing 0.5 g/l of 2,2'-dinaphthyl methane-6,6'-disulfonic acid sodium salt.

To this liquor is then added 1.5% (of the total weight of the material) of the disperse dyestuff having formula VII

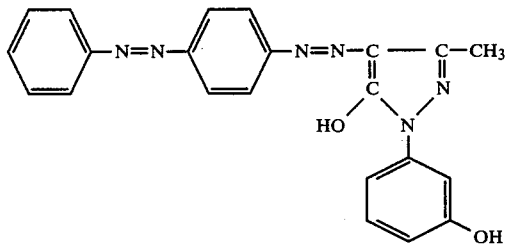

in its liquid state, worked up commercially. The dyebath is heated to 130° C. within 40 minutes, and the material is dyed for 30 minutes at this temperature. The dyeing is then rinsed under heat and given an after-treatment by reduction.

The result is a golden-yellow coloration that is not quite even and poorly fast to rubbing due to filtering-off of precipitations from the disturbed dyestuff dispersion.

(b) Example

If the 2,2'-dinaphthyl methane-6,6'-disulfonic acid sodium salt is replaced in the context of the above described dyeing operation by 0.6 g/l of the water-soluble linear polyester mentioned in Example 1 and by 0.4 g/l of the combination of oxethylation products also mentioned in Example 1, and if the above described process is carried out, a fast to rubbing, even, golden-yellow coloration is obtained without any precipitations onto the packages.

The dyestuff which had been unsuitable for dyeing packages in the past, may now be used without troubles.

EXAMPLE 5

The dyeing process is carried out as described in paragraph 4b, however with
2% of the disperse dyestuff of formula VIII

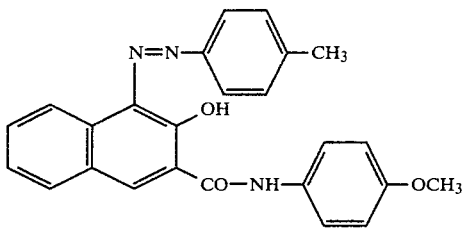

in its liquid state and in a consistency which had been unsuitable in the past for dyeing packages, and with 0.7 g/l of the mixture equal parts of the two additives of the invention known from Example 1.

An even, fast to rubbing, brilliant, scarlet color shade is obtained.

If the same dyeing process is carried out with the substitution of the water-soluble linear polyester by a commercially available dispersing agent, e.g. based on the condensation product of formaldehyde and cresol, the result is a useless, uneven, dull coloration with a lack of fastness to rubbing due to dyestuff deposits.

We claim:

1. In a process for the level dyeing of fiber material made from linear polyesters and from mixtures thereof with natural fibers, with water-insoluble disperse dyestuffs according to the exhaust method in the presence of a water-soluble or dispersible linear polyester of the formula

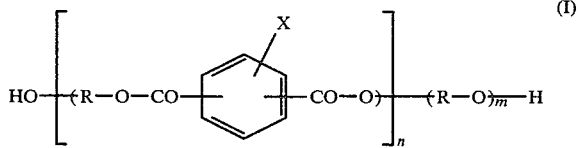

in which m is zero or 1, n is a number such that the average molecular weight of the polyester is 800–5,000, each X, which may be the same or different, is H, $-O-CH_2-CH_2-CH_2-SO_3M$ or $-SO_3M$, in which M is hydrogen or alkali metal or ammonium or substituted ammonium, and each R, which is the same or different, is a diol radical of 2-10 carbons of a saturated or unsaturated aliphatic, cycloaliphatic or aromatic compound and in which the meaning of X is balanced such that 5-30 mole % of all phenylene nuclei in formula I carry a sulfato-containing radical, the improvement which comprises: adding to the aqueous dyebath, in addition to the said dyestuffs and pH regulating substances, as dispersing system having levelling action the aforesaid polyesters of formula I combined with surface-active oxethylation products comprising a mixture of (A) fatty acid polyglycol esters, (B) polyglycol and (C) oxethylated alkylaryl compounds, in a ratio of from 1:0.25 to 1:1.5.

2. A process as claimed in claim 1, wherein a polyester of formula I is used in which up to 40% of the chain members have been replaced by hydroxycarboxylic acid units.

3. A process as claimed in claim 1, wherein a polyester of formula I is used in which the dicarboxylic acid component is a benzene dicarboxylic acid.

4. A process as claimed in claim 1, wherein a polyester of formula I is used in which the prevalent diol component is an aliphatic diol containing at least one ether bridge.

5. A process as claimed in claim 4, in which the diol component is diethylene glycol or a polyethylene glycol.

6. A process as claimed in claim 1, wherein n is a number such that the average molecular weight of the polyester of formula I is 1,000 to 3,000.

7. A process as claimed in claim 1, wherein oxethylation products used comprise a mixture of
   (A) an addition compound of 1 to 10 mols of ethylene oxide to 1 mol of a saturated or unsaturated aliphatic carboxylic acid having from 10 to 20 carbon atoms,
   (B) a polyethylene glycol having an average molecular weight of from 300 to 1,000, and
   (C) an addition compound of from 5 to 15 mols of ethylene oxide to 1 mol of an alkyl phenol having from 12 to 22 carbon atoms.

8. A process as claimed in claim 7, wherein the polyethylene glycol mixture compound has an average molecular weight of from 500 to 800.

9. A process as claimed in claim 1, wherein the dispersing system comprising polyesters of formula I and oxethylation products is added to the dye liquor in a total concentration of from 0.5 to 3.0 g/l.

10. A process as claimed in claim 1, which is a normal high-temperature or rapid-dyeing process.

11. A process as claimed in claim 1, wherein a mixture of the polyester and oxethylation products is added to the dye liquor.

12. A process as claimed in claim 1, wherein the polyester and oxethylation products are added separately to the dye liquor.

* * * * *